Sept. 10, 1929.   M. H. PITTMAN   1,727,442
INDICATING DEMAND FLOW METER
Filed April 20, 1927
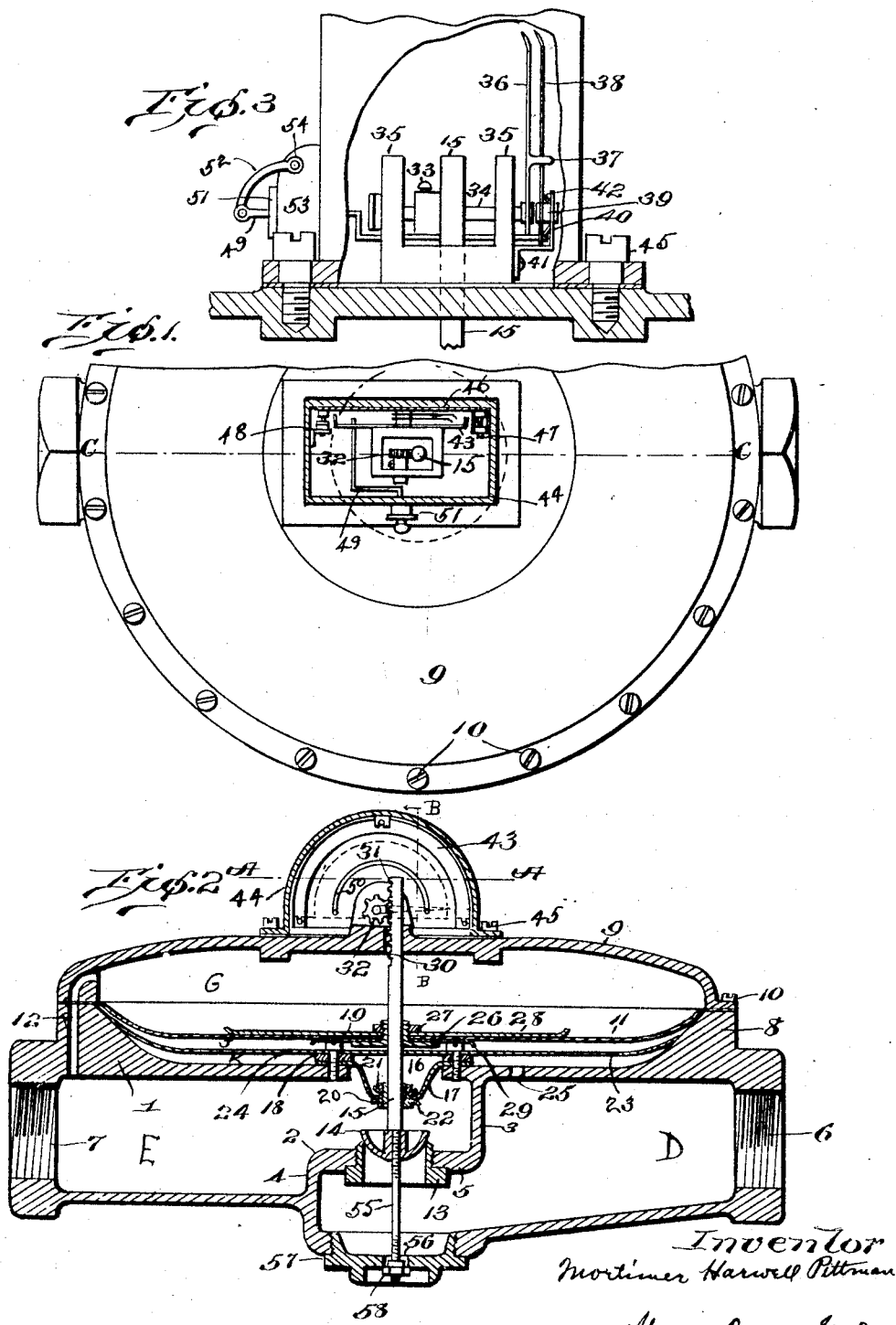

Patented Sept. 10, 1929.

1,727,442

UNITED STATES PATENT OFFICE.

MORTIMER HARWELL PITTMAN, OF ATLANTA, GEORGIA.

INDICATING DEMAND FLOW METER.

Application filed April 20, 1927. Serial No. 185,228.

Broadly this invention relates to measuring and indicating devices, but it more especially comprehends the type known as indicating demand flow meters for showing the quantity of fluid passing through the meter per unit of time.

The principal object of this invention is the provision of a device of this character for indicating the rate of flow of the fluid, in quantity per unit of time, passing through the device at the instant of observation, and at the same time recording the maximum rate of flow during any period of time.

Another object of this invention is the provision of a flexible diaphragm mechanism for maintaining the pressure loss through an orifice at an approximately constant figure, and adapted to actuate an indicating mechanism for indicating and recording the rate of flow of the fluid through said orifice.

A further object of this invention is the provision of a dial mechanism comprising two pointers or hands, one of said pointers adapted to indicate the rate of flow of the fluid, in quantity per unit of time, passing through the meter at the instant of observation, and the other pointer adapted to be automatically operable in ascending dial scale direction only, by the first mentioned pointer, to record the maximum rate of fluid flow during any period of time.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a top plan view of the meter with parts broken away and the dial casing removed along the line A—A of Fig. 2;

Fig. 2 is a vertical cross sectional view taken on the line C—C of Fig. 1; and

Fig. 3 is a view on the line B—B of Fig. 2 with a portion of the dial casing broken away.

The pressure indicating devices with which I am familiar have proven on account of frictional contacts or for other reasons not sufficiently sensitive to pressure differences to correctly show and record the rate of fluid flow, or by reason of intricate and expensive construction unsatisfactory, and it was to overcome such deficiencies, and to provide a meter extremely sensitive to fluid pressure differences and having indicating valve actuating means controlled by the fluid flow for indicating and recording the quantity of fluid passing through the meter per unit of time, said valve means being so constructed as to give approximately equal increments of valve head lift for equal increments of quantities of fluid passing through the valve seat, that I designed the meter forming the subject matter of this invention.

In the illustrated embodiment characterizing this invention there is shown a hollow base casting 1 provided with a substantially centrally located partition 2 formed with upwardly and downwardly extending off-set vertical walls 3 and 4, respectively, connected by a horizontal or shelf portion 5, said partition forming the compartments D and E extending partially under and above, respectively, the portion 5. The chamber D is formed with a fluid inlet opening 6 and the chamber E with a similar outlet opening 7. The base casting 1 is formed with an upstanding circumferential flange portion 8 on which is mounted the cover 9 secured thereto by a plurality of screws or other fastening elements 10. A flexible diaphragm 11 is clamped between the cover 9 and base casting 1, as shown in Fig. 2, and forming between the diaphragm and cover compartment G which communicates with compartment E by port 12.

Communication between compartments D and E is effected by a threadedly adjustable tubular-like valve seat member 13 extending through the portion 5 and on which is adapted to seat the hollow semi-spherical valve head 14 threadedly or otherwise suitably secured to the lower end of valve rod 15 which extends upwardly through an opening 16 in the upper wall of compartment E of considerably greater diameter than that of said rod. Said opening 16 being sealed and the valve rod 15 yieldingly supported by a flexible diaphragm 17 clamped to the base member 1 by a small clamp ring 18 secured by screws 19 or other suitable fastening elements, and secured to the valve rod 15 by a collar and threaded nut 21 between the stiffening elements or washers 22, the collar 20 being soldered, keyed or otherwise secured on said valve rod at a point spaced downwardly from said opening 16.

A dash plate 23 mounted on the clamp ring 18 secured by screws 19 is designed to protect the diaphragm from the rough casting 1, and at the same time forms compartments J and K between which communication is effected by port 24, communication between compartments D and K being effected by port 25. The flexible diaphragm 11 is firmly secured at its center to the valve rod 15 by a collar 26 and threaded nut 27 between the stiffening elements or plates 28 and 29, respectively, the former or top member being of greater diameter than the latter.

The upper end of valve rod 15 extends above the cover 9 through an aperture 30 and terminates in a plurality of teeth 31 adapted to mesh with a pinion 32 secured by screws 33 on shaft 34 mounted in suitable bearings in the spaced upstanding lugs 35 integrally formed on the cover 9. A pointer, or what may be termed a "test hand" 36, is suitably secured on the outer or free end of shaft 34 and has a lug 37 projecting laterally from one edge adapted to contact with and move in recording direction a maximum indicating pointer or hand 38 similar to and spaced from hand 36. Hand 38 is rotatably mounted on a stub shaft 39 positioned in spaced longitudinal alignment with respect to shaft 34 and suitably mounted in a substantially L-shaped bracket 40 secured to the lug 35 as at 41. Also mounted on stub shaft 39 seating against the bracket 40 with its oppositely extending extremities frictionally engaging the hand 38 is a leaf or friction spring 42 adapted to properly balance and maintain said hand 38 at the highest point of the scale to which it has been carried by the hand 36. The scale or suitable indicia (not shown) is carried by the dial plate 43 suitably secured to lug 35 intermediate said lug and hand 36.

The dial and indicating mechanism above described is housed by a dial cover or casting 44 detachably secured to the cover 9 by a plurality of screws or fastening elements 45, and is formed with an opening in front adapted to be closed by a dial glass 46 secured by bolts 47 inserted through lugs 48 integrally formed on the casting 44, so that the position of the "test hand" 36 and maximum indicating hand 38 may be readily observed.

A hand set crank 49 for turning back the hand 38 is mounted adjacent the lugs 35 with one end extending through the arcuate slot 50 in the dial plate 43 for engagement with the maximum indicating and recording hand 38 and the other extending through the dial casting 44 and a stuffing box 51 suitably mounted on the casting 44 exterior thereof and at a point in longitudinal alignment with the shaft 34, and adapted to be normally sealed in inoperative position by means of link 52 having one end hingedly or otherwise attached to the outer end of said crank 49 and the other suitably sealed to lug 53 on the casting 44 as at 54. By removing this seal, the maximum indicating and recording hand 38 may be returned to zero or its initial starting point by manually operating the crank 49, whereupon the said crank may be returned to inoperative position and again sealed.

What may be termed a shipping pin 55 is provided having one end threadedly engageable with the valve head 14 and the other extending through an aperture 56 in the bottom screw plug member 57 and engageable by nut 58 to hold the valve head 14 firmly on the valve seat 13 to prevent the mechanism of the meter from being damaged in handling, and which pin 55 is designed to be removed and the aperture 56 suitably plugged or otherwise closed when the meter is in operation.

*Operation.*

In operation, the gas or other fluid enters compartment D through inlet port 6 and into compartments K and J through ports 25 and 24, respectively. The fluid enters compartment E from compartment D through valve seat 13 and into compartment G through port 12 and exits from compartment E through outlet port 7. It will thus be seen that after the chambers or compartments have been initially filled, there will be a normally constant flow from compartment D to compartment E through valve seat 13, and since the position of valve head 14 above the valve seat 13 corresponds to some certain definite quantity of fluid passing through said valve seat, the pressure difference between compartments D and E will thus remain at an approximately constant figure. In order to more accurately gauge the fluid flow, the valve head 14 is made in the form of a part of a sphere, which gives, approximately, equal increments of valve head lift for equal increments of quantities of fluid passing through the valve seat.

As above shown, the difference between the pressures in compartments D and E is kept at an approximately constant figure, for when this difference in pressure varies above or below the figure for which the meter is designed, the main diaphragm 11, valve rod 15 and valve head 14 rise or fall thereby not only exposing a larger or smaller opening between valve seat 13 and valve head 14 causing such pressure difference to return to the standard or normal figure, but also communicates such movements to the hand 36 through the instrumentality of valve head 14, valve rod 15, pinion wheel 32, and shaft 34, thereby indicating on the dial the rate of flow of the fluid through the meter at the instant of observation.

As a résumé: When no fluid is passing through the meter, the pressures in all compartments are identical and are the same as the pressure in the line and valve head 14 is in contact with the valve seat 13; if the pressure in the outlet line is reduced by the opening of an outlet, the pressures in compartments E and G will be likewise reduced below the pressure in compartments D, K and J, the valve head 14 remaining in contact with valve seat 13 until the difference in pressure between compartment J and compartment G acting upward on diaphragm 11 is sufficient to lift the combined weight of the moving parts such as valve rod 15, etc., whereupon, valve head 14 raises above valve seat 13 allowing sufficient fluid to pass from compartment D to compartment E to maintain this differential. If the pressure in compartments E and G is still further reduced by the opening of additional outlets on the outlet line, the valve head will raise further over the valve seat 13 to maintain the required differential between compartments J and G; thus when the instrument is operating, the distance of the valve head 14 above valve seat 13 is directly proportional to the amount of the fluid passing through the valve seat 13 per unit of time, and this distance is indicated by the hand 36 showing on a suitable scale the quantity of fluid passing over the valve seat 13 per unit of time, and the hand 38, when the hand 36 returns towards the zero point of the scale, remains at the highest point of its travel, indicating the maximum rate of fluid flow during any period of time, until returned to zero by the manually operable hand set crank 49.

Although in practice, I have found the form of my invention illustrated in the accompanying drawings and referred to in the above description to be the preferred embodiment and to be the most efficient and practical, yet realizing that conditions concurrent with the adoption of my device will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A meter including an inlet chamber and an outlet chamber, an orificed partition separating said chambers, means forming a chamber, a diaphragm dividing said chamber into upper and lower sections, the lower section communicating with the inlet chamber and the upper section communicating with the outlet chamber, valve means associated with the orifice in the partition to normally interrupt the fluid flow from the inlet to the outlet chamber, said diaphragm being connected to the valve means and controlled by the fluid pressure in the upper and lower sections to actuate the valve means and permit the fluid flow from the inlet to the outlet chamber in direct proportion to the different pressures in said sections, and indicating means actuated by the valve means to show the rate of fluid flow from the inlet to the outlet chamber.

2. A meter including a fluid conduit, an orificed partition dividing said conduit into inlet and outlet chambers, means forming a chamber, a diaphragm dividing said chamber into upper and lower sections, a diaphragm protective means dividing said lower section into two communicating chambers, said chambers being in communication with the inlet chamber, and the upper section communicating with the outlet chamber, the difference between the fluid pressures in the inlet and two communicating chambers, and that in the outlet and upper section adapted to be the same under flow conditions and to be equal under no flow conditions, valve means associated with the orifice in the partition to normally interrupt the fluid flow from the inlet to the outlet chamber, said diaphragm being connected to the valve means and controlled by the fluid pressures in the upper and lower sections to actuate said valve means and control the fluid flow from the inlet to the outlet chamber to maintain equality of the pressures in said upper and lower sections, and means actuated by said valve means to indicate the rate of fluid flow from the inlet to the outlet chamber.

3. A meter including a fluid conduit, a partition in said conduit forming inlet and outlet chambers, a valve seat in said partition, a valve mechanism including a valve head seating on said valve seat adapted to normally interrupt the fluid flow from the inlet to the outlet chamber, means forming a chamber, a diaphragm dividing said chamber into upper and lower sections said diaphragm connected with said valve mechanism and controlled by the fluid pressure in the respective sections to actuate said valve mechanism to permit the fluid flow from the inlet to the outlet chambers in direct proportion to the different pressures thereof, and means operable by said valve mechanism for separately indicating the present and maximum rate of flow through said valve seat during operation of the meter, and means for maintaining said valve head firmly in contact with said valve seat, and valve mechanism, diaphragm, and indicating mechanism in rigid association to prevent damage thereto during handling of the meter when not in operation.

4. A meter for indicating the rate of flow of a fluid therethrough comprising means forming inlet and outlet chambers, a partition separating the chambers, a valve mechanism located in the partition, means forming a chamber extending substantially over both of said chambers, a diaphragm mounted in said chamber connected to said valve mechanism and dividing said chamber into upper and lower sections, said upper section communicating with the outlet chamber and the lower section with the inlet chamber, an indicating mechanism mounted exterior of said chamber and connected to said valve mechanism, a plug tap adapted for detachable threaded engagement with the bottom wall of the inlet chamber, means adapted to firmly secure the valve and elements connected thereto in rigid association with the said plug to prevent movement of said elements during handling of the meter.

5. A meter including a fluid conduit having inlet and outlet sections and a chamber overlying said sections, means to normally interrupt the fluid flow from the inlet to the outlet section, a diaphragm member dividing said chamber and connected with said means, there being a communicating passage from the inlet section to one side of the diaphragm and from the outlet section to the other side of the diaphragm, the pressure of the inlet section exerting its effect upon one surface of the diaphragm and that of the outlet section upon the opposite surface of the diaphragm, said diaphragm being adapted to actuate said means and permit the fluid flow from the inlet to the outlet section in direct proportion to the different pressures thereof, an indicating hand actuated by said means adapted to indicate the rate of fluid flow per unit of time through the device at the moment of observation, and an additional indicating hand operable by the first mentioned hand for recording the maximum rate of fluid flow through any predetermined period of time.

MORTIMER HARWELL PITTMAN.